(12) United States Patent
Lyman et al.

(10) Patent No.: US 8,051,009 B2
(45) Date of Patent: Nov. 1, 2011

(54) METHOD AND APPARATUS FOR MAINTAINING SOFTWARE AT A THIRD-PARTY SERVER

(75) Inventors: David R. Lyman, Waltham, MA (US); Shiu-Kei Cheung, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 601 days.

(21) Appl. No.: 11/732,849

(22) Filed: Apr. 4, 2007

(65) Prior Publication Data

US 2008/0249945 A1    Oct. 9, 2008

(51) Int. Cl.
*G06F 21/00* (2006.01)

(52) U.S. Cl. .......................................... 705/50; 717/178

(58) Field of Classification Search ........................ None
See application file for complete search history.

(56) References Cited

U.S. PATENT DOCUMENTS

| | | | |
|---|---|---|---|
| 5,375,240 A * | 12/1994 | Grundy | 726/28 |
| 7,315,959 B2 * | 1/2008 | Wu | 714/6 |
| 7,392,423 B2 * | 6/2008 | Henrickson | 714/4 |
| 2002/0082927 A1 * | 6/2002 | Borenstein et al. | 705/21 |
| 2007/0038884 A1 * | 2/2007 | Campbell et al. | 714/4 |

* cited by examiner

*Primary Examiner* — Jamie Kucab
(74) *Attorney, Agent, or Firm* — Park, Vaughan, Fleming & Dowler LLP

(57) ABSTRACT

One embodiment of the present invention provides a system that facilitates maintaining software at a third-party server. During operation, the system receives the software at the third-party server, wherein the end-user has rights to the software. The system also receives information which is associated with the software at the third-party server. The system then stores the software and the information at the third-party server on behalf of the end-user. Furthermore, note that storing the software and the information at the third-party server facilitates subsequent installations of the software on a client.

13 Claims, 4 Drawing Sheets

METHOD AND APPARATUS FOR MAINTAINING SOFTWARE AT A THIRD-PARTY SERVER

BACKGROUND

Related Art

Many companies have recently made their software available for online purchasing and downloading. However, for various reasons, many customers are hesitant to embrace such online software delivery. These reasons can include: problems with reinstalling software after a system failure; insufficient network bandwidth to rapidly deliver the software; and general insecurity of the customer about using a new delivery mechanism.

For example, some customers are hesitant to purchase software using electronic delivery because they worry about not being able to reinstall the software in the case of a disaster, such as a failure of their computer system. Even if the software vendor offers free subsequent downloads, many end-users store all of their access information on their computer, and this information may be lost during a system failure. Furthermore, some customers just prefer having possession of a physical installation medium, such as a CD-ROM.

Another potential problem is that some customers' systems have limited resources, such as slow Internet connections or limited hard disk space for storing the software downloads. These limited resources can make it harder for customers to download and store large software packages.

SUMMARY

One embodiment of the present invention provides a system that facilitates maintaining software at a third-party server on behalf of an end-user to facilitate subsequent reinstallations of the software. During operation, the system receives the software at the third-party server, wherein the end-user has rights to the software. The system also receives information, which is associated with the software, at the third-party server. The system then stores the software and the information at the third-party server on behalf of the end-user. This enables the third-party server to subsequently reinstall the software on a client.

In some embodiments of the present invention, the system receives a command at the third-party server from the end-user to install the software on the client. In response to the command, the system sends the software to the client, thereby allowing the client to subsequently install the software.

In some embodiments of the present invention, the information includes at least one of: a license key for the software; a copy of a license enabling use of the software; information related to the purchase of the software; contact information for a company that created the software; contact information for a company that sold the software; version information which specifies a version of the software; a copy of a support agreement which details support information for the software; a manual for using the software; and any other information related to the installation and use of the software.

In some embodiments of the present invention, receiving the software at the third-party server involves receiving the software from one of: the end-user, a retailer of the software, a creator of the software, a distributor of the software, or any other party who may deliver the software on the user's behalf.

In some embodiments of the present invention, the system receives an update for the software at the third-party server. The system then applies the update to the software on the third-party server.

In some embodiments of the present invention, the system receives configuration information for the software at the third-party server from the end-user. The system then pre-configures the software with the configuration information so that subsequent installations of the software are pre-configured with the configuration information.

In some embodiments of the present invention, the system determines if the software conflicts with resources on the client. If so, the system notifies the end-user of the conflict.

In some embodiments of the present invention, if the software conflicts with resources on the client, the system determines if a version of the software exists that would not produce a conflict. If so, the system acquires the version of the software that would not produce the conflict. Furthermore, the system could also notify the end-user of alternative versions of software that may not produce the same conflict.

One embodiment of the present invention provides a system that maintains software at a third-party server on behalf of an end-user to facilitate subsequent reinstallations of the software. During operation, the system sends the software to the third-party server from a software source, wherein the end-user has rights to the software. The system also sends information which is associated with the software to the third-party server. Note that sending the software and the information to the third-party server allows the third-party server to subsequently install the software on a client.

In some embodiments of the present invention, the system sends a command to the third-party server to install the software on the client. In response to the command, the system sends the software to the client and installs the software on the client.

In some embodiments of the present invention, the system installs the software on a device which is coupled to the client.

In some embodiments of the present invention, the system sends a command to the third-party server to install a plurality of software components on the client, wherein the command specifies an ordering for the plurality of software components. In response to the command, the system sends the plurality of software components to the client, and installs the plurality of software components on the client in the specified order.

One embodiment of the present invention provides a system that facilitates installing software from a third-party server on a client on behalf of an end-user. During operation, the system receives the software at the client from the third-party server, the software having been previously received at the third party server from a software source. The system also receives information that facilitates installing the software on the client from the third party server, the information having been previously received at the third party server from the software source. Finally, the system uses the received information to install the received software on the client.

DETAILED DESCRIPTION

Figure 1:
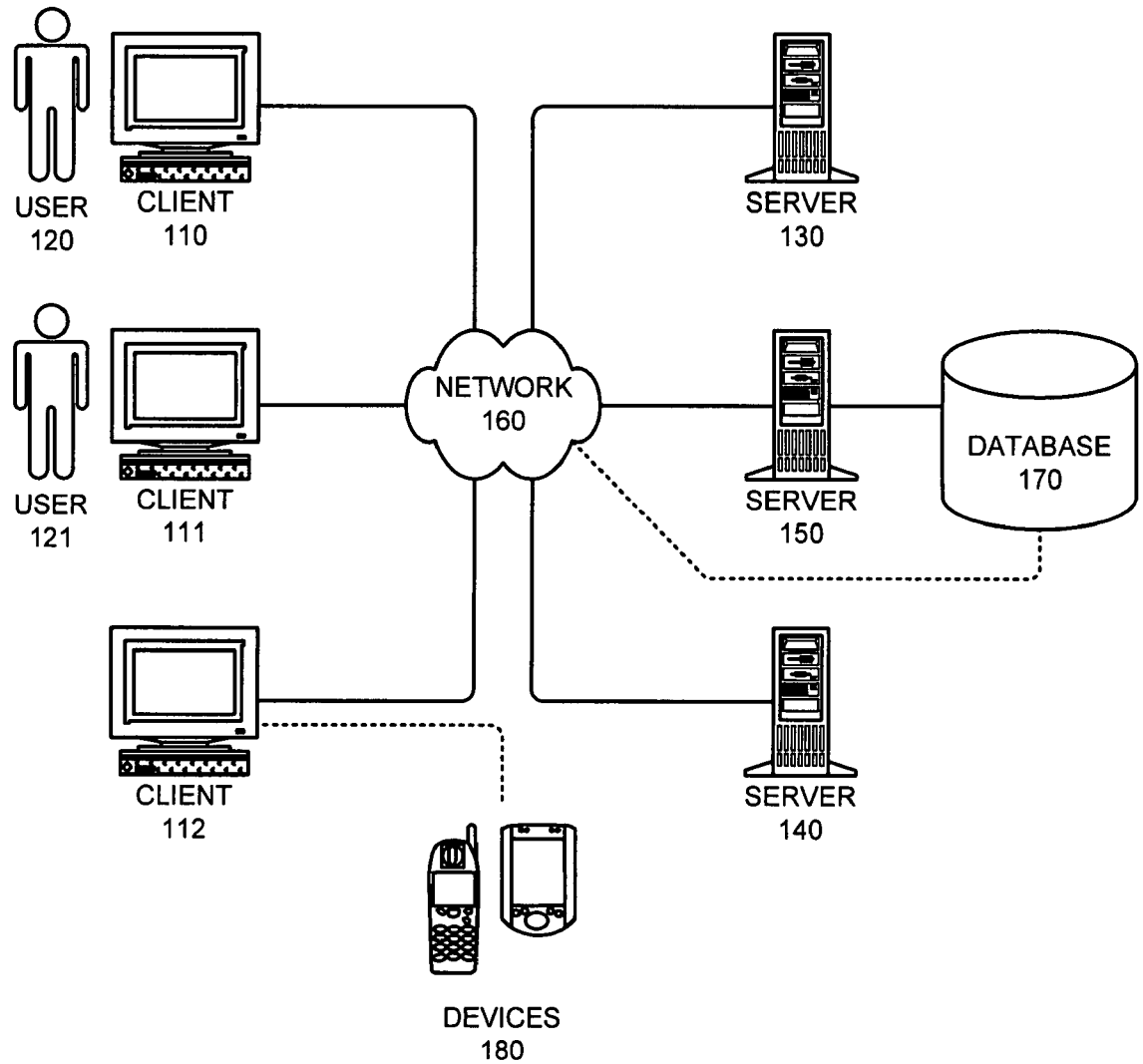
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a system that facilitates maintaining software at a third-party server on behalf of an end-user to facilitate subsequent reinstallations of the software. During operation, the system receives the software at the third-party server, wherein the end-user has rights to the software. Note that this software can be received from a variety of sources, including: the end-user, a retailer of the software, a creator of the software, or a distributor of the software, or from any other source. Furthermore, software can include a digitized set of instructions that, when executed on a computer system, cause the computer system to perform a function or a task. Note that software does not include digital multimedia files, such as digital video.

The system also receives information which is associated with the software at the third-party server. Next, the system stores the software and the information at the third-party server on behalf of the end-user. Note that storing the software and the information at the third-party server facilitates subsequent installations of the software on a client.

In some embodiments of the present invention, end-user can include anyone or anything that uses or executes the software, including a person, a business, or an end-user computer system.

In some embodiments of the present invention, the system receives a command at the third-party server from the end-user to install the software on the client. In response to the command, the system sends the software to the client, thereby allowing the client to install the software.

In some embodiments of the present invention, the information includes at least one of: a license key for the software; a copy of a license enabling use of the software; information related to the purchase of the software; contact information for a company that created the software; contact information for a company that sold the software; version information which specifies a version of the software; a copy of a support agreement which details support information for the software; a manual for using the software; and any other information related to the installation and use of the software.

In some embodiments of the present invention, the system receives an update for the software at the third-party server. The system then applies the update to the software on the third-party server. Note that this can involve storing the update along with the software, or alternatively, modifying the software to include the update.

In some embodiments of the present invention, the system receives configuration information for the software at the third-party server from the end-user. The system then pre-configures the software with the configuration information so that subsequent installations of the software are pre-configured with the configuration information. This configuration can include installation options, user preferences, or any other configuration information.

For example, consider the case where an end-user installs an item of software that is maintained by the third-party server. In addition, the end-user enters information during installation, such as a designation of a directory in which to install the software and a company name to which the software is registered. In this case, the system automatically collects and sends this information to the third-party server. During subsequent installations of the software from the third-party server, this information, including any choices, could be re-entered automatically by the system.

In some embodiments of the present invention, the system determines if the software conflicts with resources on the client. If so, the system notifies the end-user of the conflict. Note that resources can refer to: additional software installed on the client, hardware installed on the client, data files on the client, and any other resources that may result in the loss of functionality of the software.

For example, the system may determine that the end-user has a version of an item of software that has interoperability issues with a version of a second piece of software owned by the end-user. In this example, the system could: notify the end-user of the conflict; upgrade or update the software to eliminate the conflict; or both. Note that this conflict check can be performed: as software is delivered to the third-party server for management; each time the third-party server receives a software update; at scheduled times; or as requested by an end-user or administrator.

In another example, the system may determine that the hardware installed on the client is insufficient to execute the software; while in a third example, the system may determine that the software uses a different file format than other items of software installed on the client. In some embodiments of the present invention, the system sends comprehensive configuration information of the client computing environment to the third-party server, which the third-party server stores on behalf of the client in order to facilitate the detection of conflicts.

In some embodiments of the present invention, if the software conflicts with resources on the client, the system determines if there exists a version of the software that would not produce a conflict. If so, the system acquires the version of the software that would not produce the conflict. Furthermore, the system could also notify the end-user of alternative versions of software that may not produce the same conflict.

For example, in one embodiment of the present invention, upon determining that a recently received item of software conflicts with the configuration of the client, the system: notifies the end-user of the conflict and takes no further action (in the case where the system is unaware of any resolutions for the conflict); notifies the end-user of the conflict and recommends a solution to resolve the conflict (in the case where the system is aware of a resolution that requires further action by the end-user, such as purchasing an upgrade); or proactively updating the software to eliminate the conflict. Note that in some embodiments of the present invention, the end-user or a system administrator can configure these notification and resolution actions.

One embodiment of the present invention provides a system that facilitates maintaining software at a third-party server on behalf of an end-user to facilitate subsequent reinstallations of the software. During operation, the system sends the software to the third-party server from a software source, wherein the end-user has rights to the software. The system also sends information which is associated with the software to the third-party server. Note that sending the software and the information to the third-party server facilitates subsequent retrievals of the software from the third-party server, and subsequent installations of the software on a client.

In some embodiments of the present invention, if the third-party server is maintaining the same version of an item of software for multiple individuals, the third-party server may store the version of the software only once to save storage resources.

In some embodiments of the present invention, the system sends a command to the third-party server to install multiple items of software on the client. In response to the command, the system sends the multiple items of software to the client and installs the multiple items of software on the client. Note that this can involve installing the multiple items of software in a pre-determined order. Installing the multiple items of software in a pre-determined order may be necessary to ensure that specific software plug-ins are installed for specific items of software. For example, if one item of software installs plug-ins into the end-user interface of a second item of software, it may be necessary for the second item of software to be installed first. Furthermore, installing the multiple items of software in a specific order may reduce the number of reboots needed during installation.

In some embodiments of the present invention, the system installs the software on a device which is coupled to the client. This can involve installing software on: cell phones, Personal Digital Assistants (PDAs), smart-phones, personal music players (such as mp3 players), gaming systems, digital cameras, portable storage mediums, or any other device that can be coupled to the client. Note that in some embodiments of the present invention, the system installs the software directly on these devices via the network, without the assistance of the client. For example, the system may install the software on a smart phone when the phone is coupled to the client. However, because the smart phone is capable of communicating directly with a network, the system may also install software on the smart phone without the smart phone being coupled to the client.

One embodiment of the present invention provides a system that facilitates installing software from a third-party server on a client on behalf of an end-user. During operation, the system receives the software at the client from the third-party server, the software having been previously received at the third party server from a software source. The system also receives information that facilitates installing the software on the client from the third party server, the information having been previously received at the third party server from the software source. Finally, the system uses the received information to install the received software on the client.

In some embodiments of the present invention, the system receives a request at a third-party server from the end-user to generate and deliver a physical copy of the software. In response to the request, the system stores a copy of the software on a storage medium, wherein the storage medium is subsequently delivered to the end-user. Note that this may be desirable for many reasons, such as to allow the end-user to install software on a client that does not have access to a network.

Note that some embodiments of the present invention provide a system with an interface so that the end-user can access their software library and the associated information from any computer system (e.g., through a web browser). In some embodiments of the present invention, the end-user may also manipulate and manage his or her inventory on the third-party server via the interface.

Some embodiments of the present invention include a receiving mechanism, wherein the receiving mechanism can include any mechanism for receiving the software. The receiving mechanism can include a network interface, an input device, a removable storage medium, or any other mechanism for receiving the software.

Some embodiments of the present invention include a storage mechanism, wherein the storage mechanism can include any mechanism for storing the software. The storage mechanism can include a hard drive, a Compact Disc (CD), a Digital Versatile Disc (DVD), a flash drive or any other flash memory device, a tape drive, or any other volatile or non-volatile storage capable of storing the software. The storage mechanism can be internal or external to the system, and can include network attached storage, a database, a database management system, or any other system for managing and storing data.

Some embodiments of the present invention include an installation mechanism, wherein the installation mechanism can include any mechanism for installing the software. The installation mechanism can include a computer system, as well as software on the computer system that facilitates installing the software. For example, the installation mechanism can include a software patching program that applies patches to the software.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes clients 110-112, users 120 and 121, server 130, server 140, server 150, network 160, database 170, and devices 180.

Clients 110-112 can generally include any node on a network including computational capability and including a mechanism for communicating across the network.

Servers 130-150 can generally include any system capable of hosting and/or running a service that is accessible from network 160. Furthermore, servers 130-150 can generally include any nodes on a computer network including a mechanism for servicing requests from a client for computational and/or data storage resources.

Users 120 and 121 can generally include: an individual; a group of individuals; an organization; a group of organizations; a computing system; a group of computing systems; or any other entity that can interact with computing environment 100.

Network 160 can generally include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled to a server (such as server 150), to a client, or directly through a network.

Devices 180 can include any type of electronic device that can be coupled to a client, such as client 112. This includes, but is not limited to, cell phones, Personal Digital Assistants (PDAs), smart-phones, personal music players (such as mp3 players), gaming systems, digital cameras, portable storage mediums, or any other device that can be coupled to the client. Note that in some embodiments of the present invention, devices 180 can couple directly to network 160 and can behave as clients 110-112.

Maintaining Software on a Third-Party Server

Figure 2:
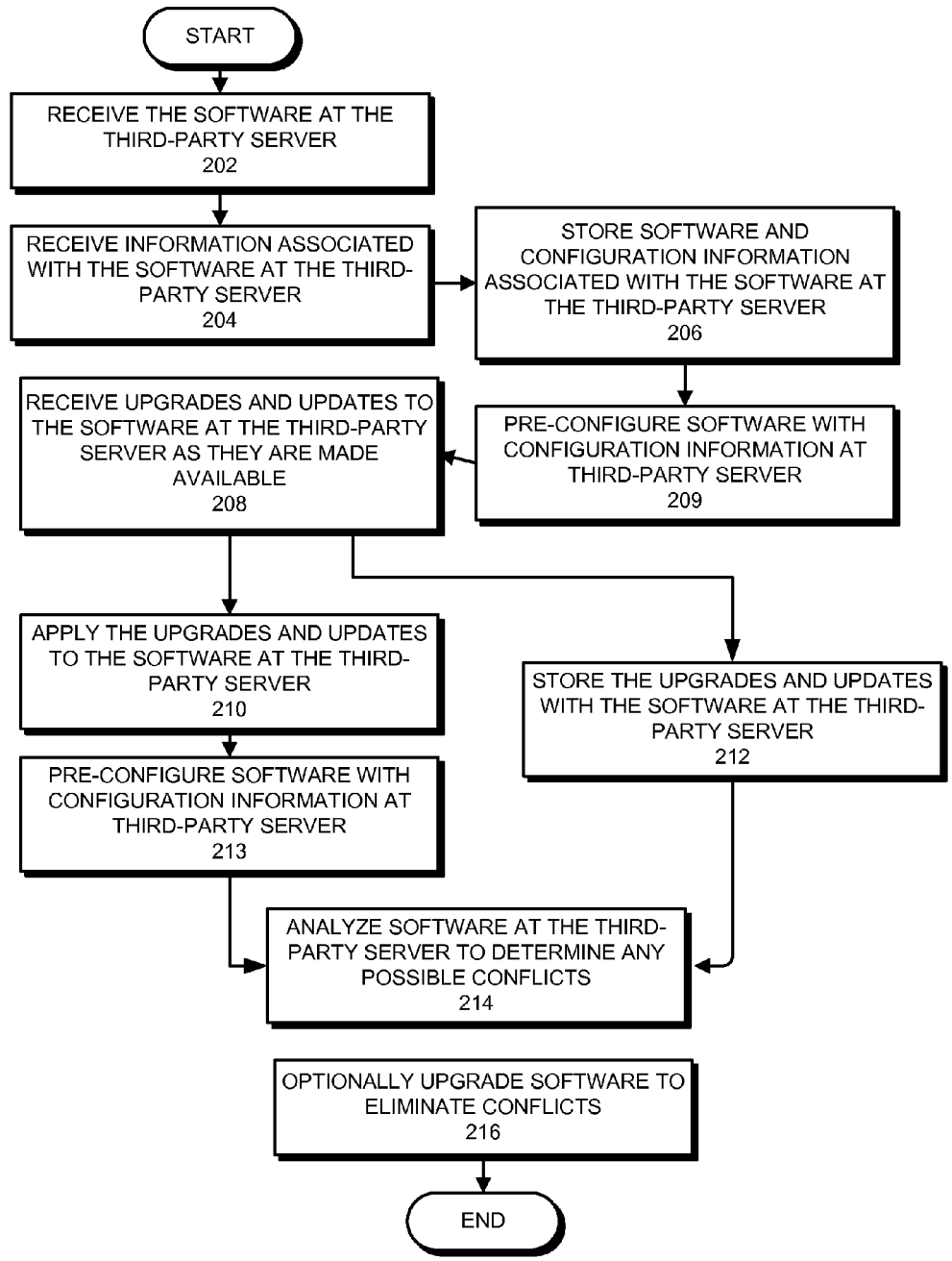
FIG. 2 presents a flowchart illustrating the process of maintaining software on a third-party server in accordance with an embodiment of the present invention.

FIG. 2 presents a flowchart illustrating the process of maintaining software on a third-party server, such as server 130, in accordance with an embodiment of the present invention. During operation, the system receives the software at server 130, wherein an end-user has rights to use the software, such as user 120 (operation 202). Note that this software can be received from a variety of sources, including: user 120, a retailer of the software, a creator of the software, or a distributor of the software, or from any other source. In one embodiment of the present invention, while user 120 downloads software from an online retailer, the system automatically uploads the software to server 130 in the background.

Additionally, the system also receives information which is associated with the software at server 130 (operation 204). Next, the system stores the software and the information associated with the software at server 130 on behalf of user 120 (operation 206).

In some embodiments of the present invention, the system receives updates and upgrades to the software at server 130 as they are made available (operation 208). Once these updates and upgrades have been received at server 130, the system can apply the updates and upgrades to the software at server 130 (operation 210), or can store the updates and upgrades with the software on server 130 (operation 212).

In some embodiments of the present invention, the system determines if the software conflicts with resources on the client 110 (operation 214). Note that resources can refer to: additional software installed on the client, hardware installed on the client, data files on the client, and any other resources that may result in the loss of functionality of the software. If so, the system notifies user 120 of the conflict.

For example, the system may determine that user 120 has a version of an item of software that has interoperability issues with a version of a second piece of software owned by user 120. In this example, the system could: notify user 120 of the conflict; notify user 120 of the conflict and upgrade or update the software to eliminate the conflict; notify user 120 of the conflict and recommend a resolution; or proactively resolve the conflict. Note that this conflict check can be performed: as software is delivered to server 130; each time server 130 receives a software update; at scheduled times; or as requested by user 120.

In some embodiments of the present invention, if the software conflicts with additional software that server 130 is storing on behalf of user 120, the system determines if there exist versions of the software and the additional software that would not produce a conflict. If so, the system acquires the versions of the software and the additional software that do not produce the conflict, and upgrades the software on server 130 to eliminate the conflicts (operation 216). Furthermore, the system could also notify user 120 of alternative versions of software that may not produce the same conflict.

Installing Software from a Third-Party Server

Figure 3:
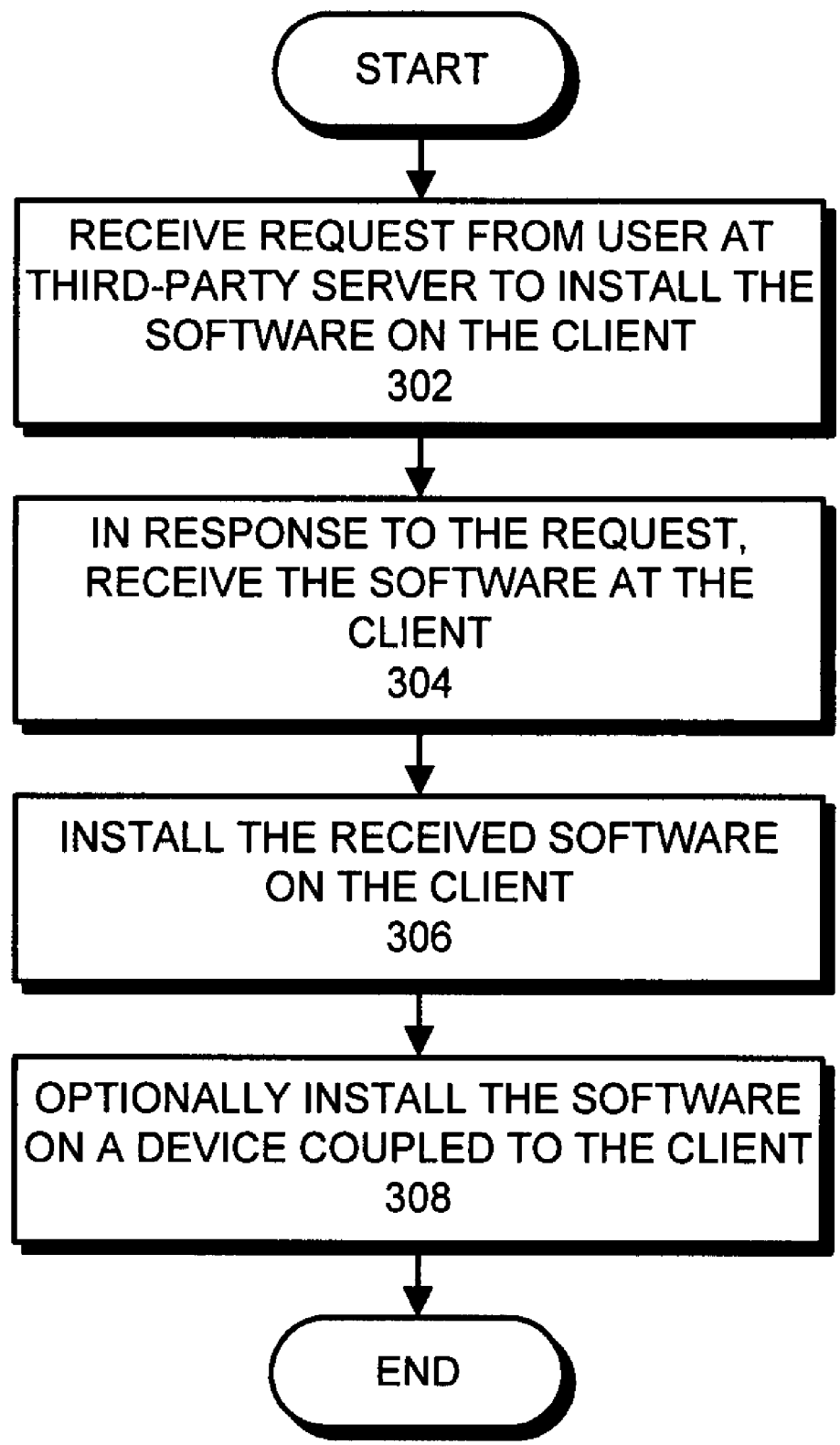
FIG. 3 presents a flowchart illustrating the process of installing software from a third-party server in accordance with an embodiment of the present invention.

FIG. 3 presents a flowchart illustrating the process of installing software from server 130 in accordance with an embodiment of the present invention. During operation, the system receives a request at server 130 from user 120 to install software that is managed by server 130 on client 110 (operation 302). Note that this can include a single item of software, or multiple items of software. In response to the request, the system receives the software at client 110 (operation 304), including previously stored configuration preferences, and installs the software on client 110 (operation 306).

Note that in the case of installing multiple items of software, this can involve installing the multiple items of software in a pre-determined order. Installing the multiple items of software in a pre-determined order may be necessary to ensure that specific software plug-ins are installed for specific items of software. For example, if one item of software installs plug-ins into the User Interface (UI) of a second item of software, it may be necessary for the second item of software to be installed first. Furthermore, installing the multiple items of software in a specific order may reduce the number of reboots needed during installation.

In some embodiments of the present invention, the system installs the software on a device from devices 180 which is coupled to client 110 (operation 308). This can include installing software on: cell phones, Personal Digital Assistants (PDAs), smart-phones, personal music players (such as mp3 players), gaming systems, digital cameras, portable storage mediums, or any other device that can be coupled to client 110.

Detecting and Resolving Conflicts

Figure 4:
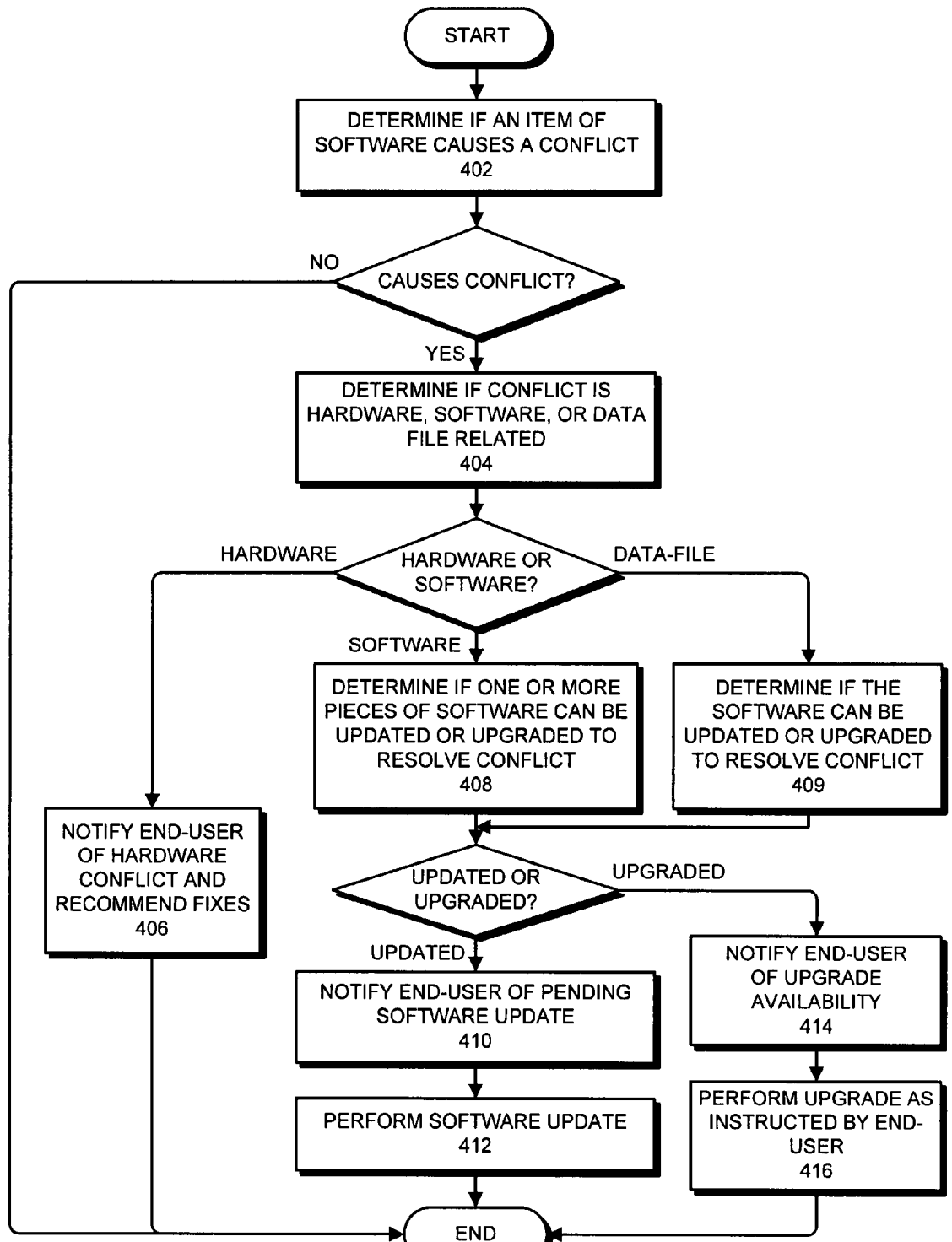
FIG. 4 presents a flowchart illustrating the process of detecting and resolving conflicts in accordance with an embodiment of the present invention.

FIG. 4 presents a flowchart illustrating the process of detecting and resolving conflicts in accordance with an embodiment of the present invention. During operation the system determines if an item of software causes a conflict with resources on client 110 (operation 402). Note that resources can refer to: additional software installed on client 110, hardware installed on client 110, data files on client 110, and any other resources that may result in the loss of functionality of the item of software. Also note that this conflict detection and resolution is performed: as software is delivered to server 150 for management; each time server 150 receives a software update; at scheduled times; or as requested by user 120 or an administrator.

Next, if a conflict is detected, the system determines if the conflict is hardware, software, or data file related (operation 404). If the conflict is hardware related, the system notifies the user 120 of the hardware conflict and recommends fixes to resolve the conflict (operation 406). These fixes can include hardware upgrades or software fixes. In the case where software fixes exist to resolve a hardware conflict, the system may treat the hardware conflict as a software conflict. However, if the conflict is software related, the system determines if one or more pieces of software can be updated or upgraded to resolve the conflict (operation 408). Note that "update" refers to patches, fixes, and any other updates that can be obtained and applied for no additional cost, or under an existing maintenance agreement. Furthermore, note that "upgrade" refers to subsequent versions of the software that are available for additional cost. Upgrade can also refer to alternate items of software.

In the case where the conflict is data file related, the system determines if the software can be updated or upgraded to eliminate the data file conflict (operation 409).

If one or more pieces of software can be updated to resolve the conflict, the system notifies user 120 of the pending software update (operation 410) and then performs the software update (operation 412). Note that in some embodiments of the present invention, user 120 may not want to have the software updated. In this case, the system may optionally notify user 120 of the availability of the update and seek a confirmation from user 120 to update the software.

In some embodiments of the present invention, user 120 (or an administrator) can configure notification and auto-update options. However, if the software must be upgraded to resolve the conflict, the system notifies user 120 of upgrade availability (operation 414) and performs an upgrade as instructed by user 120 (operation 416).

SUMMARY

Embodiments of the present invention act as a "virtual CD case" for software owned by an end-user. These embodiments store and manage software on behalf of the end-user, and manage the associated information. For example, the system can manage: activation keys, license information, purchase information, and many other forms of information associated with the software. In the case that the end-user needs to install or reinstall any of the software managed by the system, the end-user simply sends a request to the system to install the software, and the system takes care of the rest. This can involve installing the software and configuring the software on the end-user's machine according to previous installation choices.

Note that some embodiments of the present invention provide a system with an interface so that the end-user can access their software library and the associated information from any computer system (e.g., through a web browser). In some embodiments of the present invention, the end-user may also manipulate and manage his or her inventory on the third-party server via the interface.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for maintaining software at a third-party server system on behalf of an end-user at a client computer to facilitate subsequent reinstallations of the software on the client computer, the method comprising:
receiving the software at the third-party server system, wherein the end-user has rights to the software;
receiving configuration information for the software at the third-party server system from the end-user, the configuration information comprising information about a computing environment, including at least a directory designation for installation of the software at the client computer;
storing the software and the configuration information at the third-party server system on behalf of the end-user;
pre-configuring the software with the configuration information so that subsequent installations of the software on the client computer are pre-configured with the configuration information;
receiving an update for the software at the third-party server;
applying the update to the software on the third-party server; and
pre-configuring the updated software with the configuration information prior to installing the updated software on the client computer.

2. The method of claim 1, further comprising:
receiving a command from the end-user at the third-party server to install the software on the client; and
in response to the command, sending the software to the client, thereby allowing the client to subsequently install the software.

3. The method of claim 1, wherein the information includes at least one of:
a license key for the software;
a copy of a license enabling use of the software;
information related to the purchase of the software;
contact information for a company that created the software;
contact information for a company that sold the software;
version information which specifies a version of the software;
a copy of a support agreement which details support information for the software; and
a manual for using the software.

4. The method of claim 1, wherein receiving the software at the third-party server involves receiving the software from one of: the end-user, a retailer of the software, a creator of the software, or a distributor of the software.

5. The method of claim 1, further comprising:
determining if the software conflicts with resources on the client computer; and
if so, notifying the end-user of the conflict.

6. The method of claim 5, wherein if the software conflicts with resources on the client computer, the method further involves:
determining if a version of the software exists that would not produce a conflict; and
if so, acquiring the version of the software that would not produce the conflict.

7. A computer-readable storage medium storing instructions that when executed by a computer cause the computer to perform a method for maintaining software at a third-party server system on behalf of an end-user at a client computer to facilitate subsequent reinstallations of the software on the client computer, the method comprising:
receiving the software at the third-party server system, wherein the end-user has rights to the software;
receiving configuration information for the software at the third-party server system from the end-user, the configuration information comprising information about a computing environment, including at least a directory designation for installation of the software at the client computer;
storing the software and the configuration information at the third-party server system on behalf of the end-user;
pre-configuring the software with the configuration information so that subsequent installations of the software on the client computer are pre-configured with the configuration information;
receiving an update for the software at the third-party server;
applying the update to the software on the third-party server; and pre-configuring the updated software with the configuration information prior to installing the updated software on the client computer.

8. The computer-readable storage medium of claim 7, wherein the method further comprises:
    receiving a command from the end-user at the third-party server to install the software on the client; and
    in response to the command, sending the software to the client, thereby allowing the client to subsequently install the software.

9. The computer-readable storage medium of claim 7, wherein the information includes at least one of:
    a license key for the software;
    a copy of a license enabling use of the software;
    information related to the purchase of the software;
    contact information for a company that created the software;
    contact information for a company that sold the software;
    version information which specifies a version of the software;
    a copy of a support agreement which details support information for the software; and
    a manual for using the software.

10. The computer-readable storage medium of claim 7, wherein receiving the software at the third-party server involves receiving the software from one of: the end-user, a retailer of the software, a creator of the software, or a distributor of the software.

11. The computer-readable storage medium of claim 7, wherein the method further comprises:
    determining if the software conflicts with resources on the client computer; and
    if so, notifying the end-user of the conflict.

12. The computer-readable storage medium of claim 11, wherein if the software conflicts with resources on the client computer, the method further involves:
    determining if a version of the software exists that would not produce a conflict; and
    if so, acquiring the version of the software that would not produce the conflict.

13. An apparatus configured for maintaining software at a third-party server on behalf of an end-user at a client computer to facilitate subsequent reinstallations of the software on the client computer, comprising:
    a receiving mechanism configured to receive the software at the third-party server system, wherein the end-user has rights to the software;
    wherein the receiving mechanism is further configured to receive configuration information for the software at the third-party server system from the end-user, the configuration information comprising information about a computing environment, including at least a directory designation for installation of the software at the client computer;
    a storage mechanism configured for storing the software and the configuration information for the software at the third-party server system on behalf of the end-user;
    a configuration mechanism configured to pre-configure the software with the configuration information to facilitate subsequent installations of the pre-configured software on the client system;
    the receiving mechanism further configured for receiving an update for the software at the third-party server;
    an application mechanism configured for applying the update to the software on the third-party server; and
    the configuration mechanism further configured for pre-configuring the updated software with the configuration information prior to installing the updated software on the client computer.

* * * * *